(12) United States Patent
Larrew

(10) Patent No.: US 12,267,294 B1
(45) Date of Patent: *Apr. 1, 2025

(54) NONEXISTANT DOMAIN FORWARDING IN AUTHORITATIVE ZONES

(71) Applicant: United Services Automobile Association (USAA), San Antonio, TX (US)

(72) Inventor: Jason Paul Larrew, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/436,235

(22) Filed: Feb. 8, 2024

Related U.S. Application Data

(63) Continuation of application No. 17/551,036, filed on Dec. 14, 2021, now Pat. No. 11,902,242.

(60) Provisional application No. 63/128,446, filed on Dec. 21, 2020.

(51) Int. Cl.
*H04L 61/4511* (2022.01)
*H04L 9/40* (2022.01)
*H04L 61/5007* (2022.01)

(52) U.S. Cl.
CPC ...... *H04L 61/4511* (2022.05); *H04L 61/5007* (2022.05); *H04L 63/0876* (2013.01); *H04L 63/102* (2013.01)

(58) Field of Classification Search
CPC ............ H04L 61/4511; H04L 61/5007; H04L 63/0876; H04L 63/102
See application file for complete search history.

(56) References Cited

U.S. PATENT DOCUMENTS

| | | | | |
|---|---|---|---|---|
| 2007/0283194 A1* | 12/2007 | Villella | ............... | G06F 11/3476 714/E11.204 |
| 2009/0157889 A1* | 6/2009 | Treuhaft | ............. | H04L 63/1441 709/230 |
| 2012/0191874 A1* | 7/2012 | Robinson | ............ | H04L 61/4552 709/245 |
| 2013/0198269 A1* | 8/2013 | Fleischman | ............. | H04L 69/40 709/203 |
| 2017/0311032 A1* | 10/2017 | Drisko | ............... | H04N 21/4622 |
| 2018/0091531 A1* | 3/2018 | El-Moussa | .......... | H04L 63/1416 |
| 2022/0138271 A1* | 5/2022 | Suh | ..................... | H04L 63/1425 707/709 |

* cited by examiner

*Primary Examiner* — Bryan Y Lee
(74) *Attorney, Agent, or Firm* — Fletcher Yoder, P.C.

(57) ABSTRACT

Systems and techniques are provided herein to enable an authoritative DNS zone to selectively utilize a forwarding service to resolve domain names that cannot be resolved by the authoritative DNS zone. A forwarder indication may be provided in an authoritative DNS zone configuration file specific to the authoritative DNS zone to indicate whether the forwarding service is active.

20 Claims, 5 Drawing Sheets

NONEXISTANT DOMAIN FORWARDING IN AUTHORITATIVE ZONES

CROSS-REFERENCE TO RELATED APPLICATIONS

This application is a continuation of U.S. Non-Provisional patent application Ser. No. 17/551,036, entitled "NONEXISTANT DOMAIN FORWARDING IN AUTHORITATIVE ZONES," filed Dec. 14, 2021, which claims priority to and the benefit of U.S. Provisional Patent Application No. 63/128,446, entitled "NONEXISTANT DOMAIN FORWARDING IN AUTHORITATIVE ZONES," filed Dec. 21, 2020, which is hereby incorporated by reference in its entirety for all purposes.

BACKGROUND

The present disclosure relates generally to methods and systems to facilitate resolving Internet Protocol (IP) addresses to authoritative domain name system (DNS) zones via communication with external DNS services. More specifically, the methods and systems discussed herein relate to IP address retrieval techniques that employ a server DNS service within an authoritative DNS zone to query a server DNS service external to the authoritative DNS zone to retrieve an externally located IP address associated with a domain name.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

For software development in a shared private network, it is common to utilize services and resources offered by outside sources (e.g. tools, APIs, external servers etc.). In typical manifestations, the use of these services and resources can cause difficulties for users within the network. Usual processes for accessing the services and resources inside and/or outside of the network may utilize domain name/IP resolution to enable communication amongst electronic devices. In particular, in DNS, authoritative zones define particular authoritative name servers for domain resolution associated with the particular zone. For example, authoritative name servers may not recursively query a DNS tree, but instead act as an authority for DNS resolution of the authoritative zone. Unfortunately, in many instances, the authoritative name servers may not be aware of IP addresses for some external services. Accordingly, when domain names associated with these external services are provided to the authoritative name servers and the authoritative name servers do not have a record associated with the domain name, a non-existent domain (NXDomain) indication may be provided as a response to the domain name resolution request, causing the external services not to be reachable via a domain name. Unfortunately, this results in higher risk of blackouts and other negative effects. It is now recognized that a method for accessing these services from within the network would benefit users.

SUMMARY

Systems and methods are provided for retrieving an IP address associated with a domain name that is not found within an authoritative DNS zone. The method may include a client device querying a server within an authoritative DNS zone for an IP address by submitting an associated domain name. The DNS service of the server, finding no such domain name within the authoritative DNS zone, communicates with another DNS service outside of the authoritative DNS zone. The external DNS service locates the domain name and its associated IP address and returns it to the original server, which returns it to the client device.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
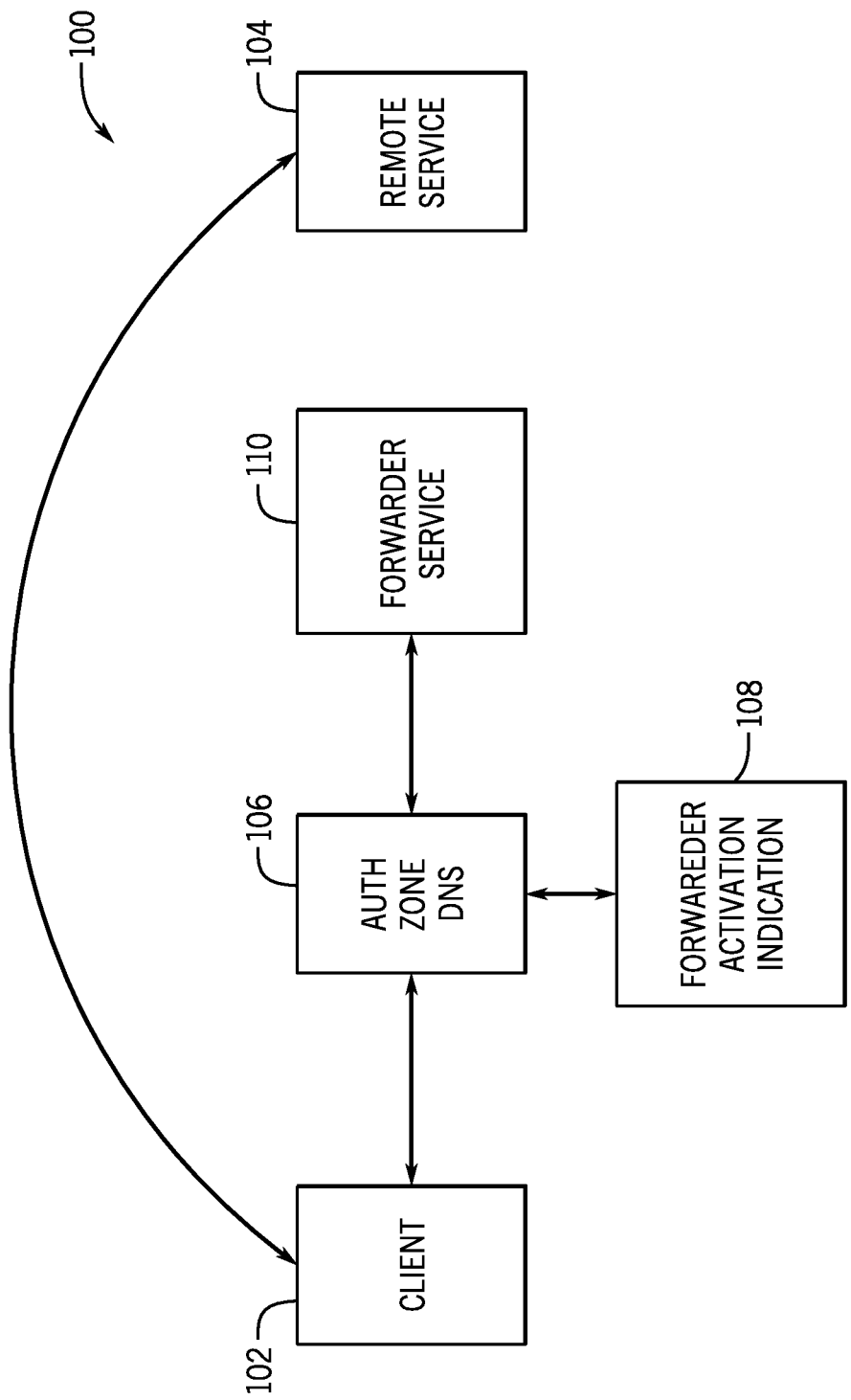
FIG. 1 is an illustration of a system for retrieving an IP address from an external forwarder service remote from a local authoritative DNS zone on a network local to a client device, in accordance with an embodiment of the current disclosure.

One or more specific embodiments of the present disclosure are described below. In an effort to provide a concise description of these embodiments, certain features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are generally directed toward systems and methods for enabling DNS authoritative zones to retrieve domain name resolution (e.g., IP addresses associated with a provided domain name) from external DNS services. In particular, the present technique utilizes a forwarder service to request an IP address from an external DNS service based on a domain name associated with the IP address.

A client device is communicatively coupled to an authoritative DNS zone within an internal network. The authoritative DNS zone may be tasked with authoritative domain name resolution. The client device may send a DNS request to the authoritative DNS zone (e.g., requesting an IP address associated with a domain name provided in the DNS request). The authoritative DNS zone receives this request and determines whether it has a record of an IP address associated with the provided domain name. If such a record does exist within the authoritative DNS zone, the associated IP address in the record is located and returned to the client device. If such a record is not found within the authoritative DNS zone, the authoritative DNS zone may determine whether a DNS forwarding mode is enabled. For example, the authoritative DNS zone name servers may identify whether the DNS records and/or configuration files of the authoritative name servers include an indicator that indicates that the DNS forwarding mode is active or inactive. In one embodiment, the indication may include a configuration line in a configuration file of the authoritative name servers.

In some embodiments, if the indication is not present, this may indicate that the DNS forwarding mode is inactive, while the presences of the indicator may indicate that the DNS forwarding mode is active.

When the indicator indicates that the DNS forwarding mode is not active and the authoritative name servers do not include a DNS record for the provided domain name, an indication (e.g., alert) may be returned to the client device, the indication specifying that the requested IP address is absent from the authoritative DNS zone records. In some embodiments, the indication may be provided in the form of an NXDomain response.

If, however, the indication indicates that the DNS forwarder mode is active, the authoritative DNS zone name servers may forward the DNS request to an external forwarding service hosted by an external server. The address of the forwarding service (e.g., where the DNS request is sent) may be provided in the indication indicating whether the DNS forwarding service is active.

The forwarder service forwards may traverse its domain tree to try and resolve the domain name to an IP address. If the domain tree includes an IP address associated with the provided domain name, the forwarding service returns the IP address to the authoritative DNS zone name servers, which return the IP address to the requesting client device, enabling the client device to access the external services via the IP address associated with domain name at the DNS forwarding service. If, however, the forwarding service does not have an IP address associated with the provided domain name, an indication of the absence of this record (e.g., in the form of an NXDomain response) is provided to the authoritative DNS zone, which forwards the indication back to the requesting client.

With the foregoing in mind, FIG. 1 is an illustration of a system 100 that uses an NX domain forwarder service, in accordance with one or more embodiments described herein. IN the system 100, a client device 102 sends a request for an IP address (e.g., via a domain name resolution request) to an authoritative zone DNS service 106.

The authoritative DNS service 106 attempts to resolve the provided domain name to an IP addressing using DNS records of the authoritative DNS service 106. However, in some instances, the authoritative DNS service 106 may not include a DNS record that can resolve the domain name to a particular IP address. In such a case, the authoritative DNS service 106 may determine a state of a forwarder activation indication 108. The forwarder activation indication 108 may provide an indication as to whether the authoritative DNS service 106 should attempt the domain name resolution using a forwarder service 110. The forwarder service 110 may be an internal DNS server that is separate from the authoritative DNS service 106, or it may be external to a local network of the authoritative DNS service 106 and/or client 102. Upon the forwarder activation indication 108 indicating that the authoritative DNS service 106 should use the forwarder service 110, the authoritative DNS service 106 sends the domain name resolution request to the forwarder service 110, which may then attempt to resolve the domain name specified in the domain name resolution request. If successful, the forwarder service 110 returns the requested IP address associated with the provided domain name to the client device 102 (e.g., via a response to the authoritative DNS service 106 or a response directly to the client 102), allowing the client 102 to access a remote service 104 associated with the IP address (e.g., by pinpointing the IP address as resolved to the domain name specified to access the remote service 104). The client device 102 may be a variety of devices (e.g. a personal computer, a tablet, a smartphone, etc.) used in a number of different tasks that may involve an remote service 104. These tasks may include, but are not limited to, software development, IT services, database management, customer service, etc.

The client device 102 is configured to interact with the remote service 104, which is external to the client device 102 and renders it some service not provided by the client's available internal resources. The remote service 104 may be provided by a company not directly related to the client, a disparate part of a company associated with the client, or a number of other sources. The service the remote service 104 provides may include cloud storage services or other cloud services, collaborative networking services, IT services, or another service that could be useful to the client. To access the remote services 104, the client device 102 may use an IP address resolved to a domain name specified to access the remote service, access information, security information, or some other resource to access the remote service 104.

As mentioned above, the actions of the authoritative zone DNS service 106, after its search does not result in resolving the domain name to an IP address, may vary depending upon the the forwarder activation indication 108. In some instances, the presence of the forwarder activation indication 108 may indicate that the use of the forwarder service 110 is enabled, while the lack of the forwarder activation indication 108 may indicate that the use of the forwarder service 110 is disabled. In such embodiments, the forwarder activation indication 108 may be a piece of executable code, a piece of data, or some other type of indication capable of determining the resultant action of the authoritative zone DNS service 106 upon being unable to resolve a resolution request.

The action undertaken by the authoritative zone DNS service 106 in response to a request sent by the client device 102 is dependent upon the state of the forwarder activation indication 108, and may result in an alert concerning the inability of the authoritative zone DNS service to retrieve the IP address, or an attempt to resolve the domain name to IP address via the forwarder service 110. Regardless of the state, if the IP address requested by the client device 102 is found by the authoritative zone DNS service 106 on the server associated with it, the authoritative zone DNS service 106 returns the found IP address to the client device 102. If the IP address is not found, and the forwarder activation indication 108 is in a state indicating that use of the forwarder service 110 is disabled, the authoritative zone DNS service 106 returns an alert to the client device 102 reporting the inability to resolve the requested domain name to an IP address (e.g., via a NXDomain message). If the IP address is not found, and the forwarder activation indication 108 is in a state indicating that the forwarder service 110 is enabled for use, the authoritative zone DNS service 106 forwards the request to the forwarder service 110, which may then attempt to resolve the domain name to an IP address using DNS of the forwarder service 110. When able, the forwarder service 110 may return the resolved IP address to the client device 102 by way of the authoritative DNS service 106 and/or a direct connection to client 102.

Figure 2:
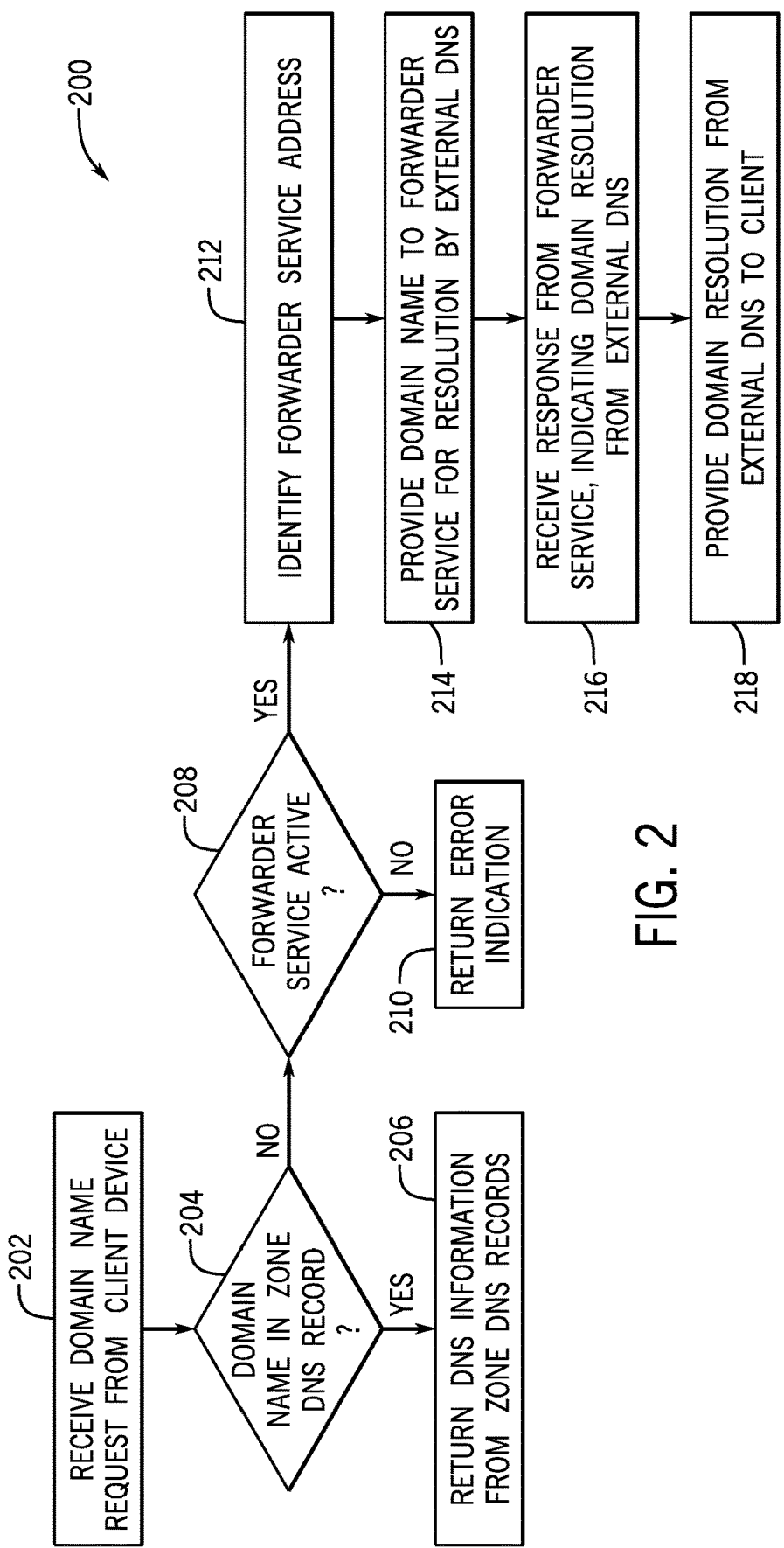
FIG. 2 is a block diagram illustrating a process for obtaining a IP address from a Remote DNS service by sending a request to a forwarding service to find an IP address using an associated domain name, in accordance with an embodiment of the current disclosure.

Turning now to a more detailed description of the domain name resolution process, FIG. 2 is a flow chart showing process 200, which describes the process of resolving a domain name search through a forwarder service. To begin process 200, the device or system receives a domain name request from the client device (block 202). For example, the domain name request may be triggered based upon remote service access actions (e.g., web browsing or other activities) that attempt to access remote services based upon provision of a domain name. As mentioned above with respect to the client device 102, the client device may be a personal computer, a smartphone, a tablet, or another device accessible to the client that can be used for tasks such as software development, IT, database management, customer service, or another task with business value. The domain name request is a query for an IP address associated with a certain domain name. The domain name may identify a remote service like the remote service 104 previously described. The eventual return of the IP address is defined as a domain name resolution.

Upon receiving the domain name request, the device or system checks for the requested domain name and the associated IP address in zone DNS records (block 204). For example, this may be performed by querying the DNS records of the authoritative zone for the domain name specified in the domain name request and identifying any IP addresses associated with domain name. The device or system associated with this check may be the authoritative zone DNS system 106, or some other device or system capable of searching for the domain name's associated IP address in a given structure. The check may result in an indication that the requested domain name and associated IP address are located in the zone DNS records. The check may also result in an indication that the requested domain name and associated IP address are not located in the zone DNS records.

In one outcome of the zone DNS records search, if the requested domain name is found in the zone DNS records, the device or system returns the domain name and the associated IP address to the client device (block 206). For example, an electronic response is provided to the client, indicating that the domain name provided in the domain name request is associated with a particular IP address. This domain resolution may be targeted toward a single client device or multiple client devices. Additionally, this domain resolution may occur once upon request, repeatedly based on trigger events such as software updates or changes in desired service, or it can occur regularly based on a schedule.

In another outcome of the zone DNS record search, if the requested domain name is not found in the zone DNS records, the device or system checks if the forwarder service is active (block 208). This may consist of a check for a forwarder activation indication like the forwarder activation indication 108, which may be a piece of executable code, a piece of data, or some other type of indication. The check may result in an indication that the forwarder service is active. The check may also result in an indication that the forwarder service is inactive. The activity or inactivity indicated by the forwarder activation indication is based on the state the indication is set to. Generally, it may be configured to a number of states that a forwarder service, such as the forwarder service 110, is available for use. It may be configured to a state that indicates that the forwarder service is available, that the forwarder service is unavailable, or some other message.

If the forwarder service is inactive, the device or system returns an indication to the client device (block 210). The device may manifest the indication in a number of ways. It may return the indication to the client device as an indication that the forwarder service is not active. It may also return an error indication to the client device that specifies the cause of the error. It may also return an indication of necessary actions for activating the forwarder service, or another type of indication useful to the client.

If the forwarder service is active, the device or system identifies the forwarder service IP address (block 212). This address may be used to access the forwarder service for use in locating the external DNS for the purpose of resolving the domain name request. As with the forwarder service 110, the forwarder service may be controlled by the client, a party associated with the client, or a party entirely separate from the client. If the client controls the forwarder service, it may be hosted on a client server. If the forwarder service is not controlled by the client, it may be hosted on a server external to the client.

Next the device or system provides the requested domain name to the forwarder service for resolution from an external DNS service (block 214). The forwarder service may identify one or more external DNS services that have access to the requested domain name and its associated IP address. These external DNS services may be associated with parties external to both the client and the forwarder service. Once given the requested domain name, the external DNS service may attempt to resolve the requested domain name and the associated IP address, initiating the domain name resolution process.

If the external DNS service locates the requested domain name and the associated IP address in its DNS records, the device or system receives a response from the forwarder service or directly from the forwarder service, indicating the IP address resolution from the forwarder service has returned a domain resolution (block 216). Otherwise a response indicating that the resolution was not successful is provided (e.g., a NXDomain response). This response is initiated upon the location of the requested domain name by the external DNS service. The response may be communicated from the external DNS service to the forwarder service, and from the forwarder service to a device. The response may alert the device or system to prepare to communicate an incoming domain resolution from the external DNS service to the client device.

Next the device or system provides the domain resolution from the external DNS service to the client device (e.g., either the resolved IP address or an NXDomain message) (block 218). This domain resolution provides the client device with the IP address associated with the requested domain name. Once the domain resolution is returned to the client device, the client device may interact with the requested domain name. This interaction may be the communication of information, or the use of a service, such as the remote service 104 described above.

Figure 3:
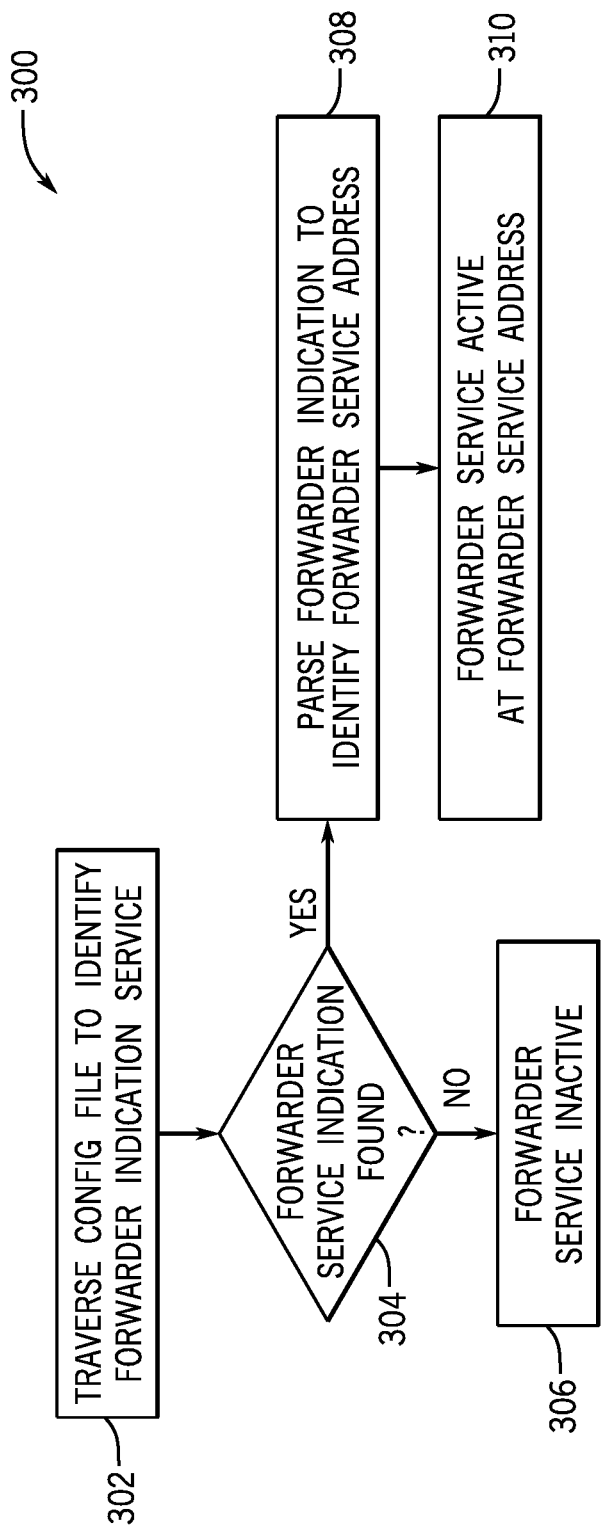
FIG. 3 is a block diagram illustrating a process for identifying if a forwarder service is active using a forwarder activation indication, in accordance with an embodiment of the current disclosure.

FIG. 3 is a flow chart showing process 300, which details an operation concerning identifying the activation state of a forwarder service in a configuration file. A device or system traverses the configuration file to identify the location of an indication concerning the forwarder service (block 302). The configuration file may be a set of machine-readable instructions accessible by the authoritative DNS service, which provide configuration details for the authoritative DNS zone. The forwarder service indication may be located in a specific zone inclusion section of the configuration file. A device or system searches each part of the configuration file until a location is found that is configured to hold the forwarder service indication.

The device or system checks if the indication was found in the previously identified location (block 304). The indication may be a piece of executable code, a piece of data, or some other type of indication capable of determining whether the forwarder service is active. In some embodiments, the presence of the indication determines if the forwarder service is to be employed. Additionally, the indication may include an indication of the forwarder service IP address, which may be used to send DNS resolution requests to the forwarder service. In other embodiments, specific payload of the indication may indicate whether the forwarder service is to be used. For example, a "Y" payload value may indicate to use the forwarder service, while a "N" payload value may indicate not to use the forwarder service.

If the indication is not found or indicates not to use the forwarder service, the device or system returns an alert that the forwarder service is inactive and/or provides an indication that the domain name resolution is unsuccessful without attempting to resolve the domain name with the forwarder service (block 306). This alert may be sent to the client device 102, or any other means of communicating to the client. An alert may also be sent if the indication is found but does not contain an IP address for the forwarder service. This alert may also contain instructions for locating and inserting the IP address of the forwarding service.

If the indication is found and indicates to use the forwarder service, the device or system parses the forwarder indication to identify the forwarder service address (block 308). This address is an IP address or other indicator by which the forwarder service may be accessed by the client. The address may be hosted on a server operated by the client, or on a server operated by an entity external to the client. Thus, the device or system may forward the domain name resolution request to the forwarder service at the forwarder service address (block 310).

Figure 4:
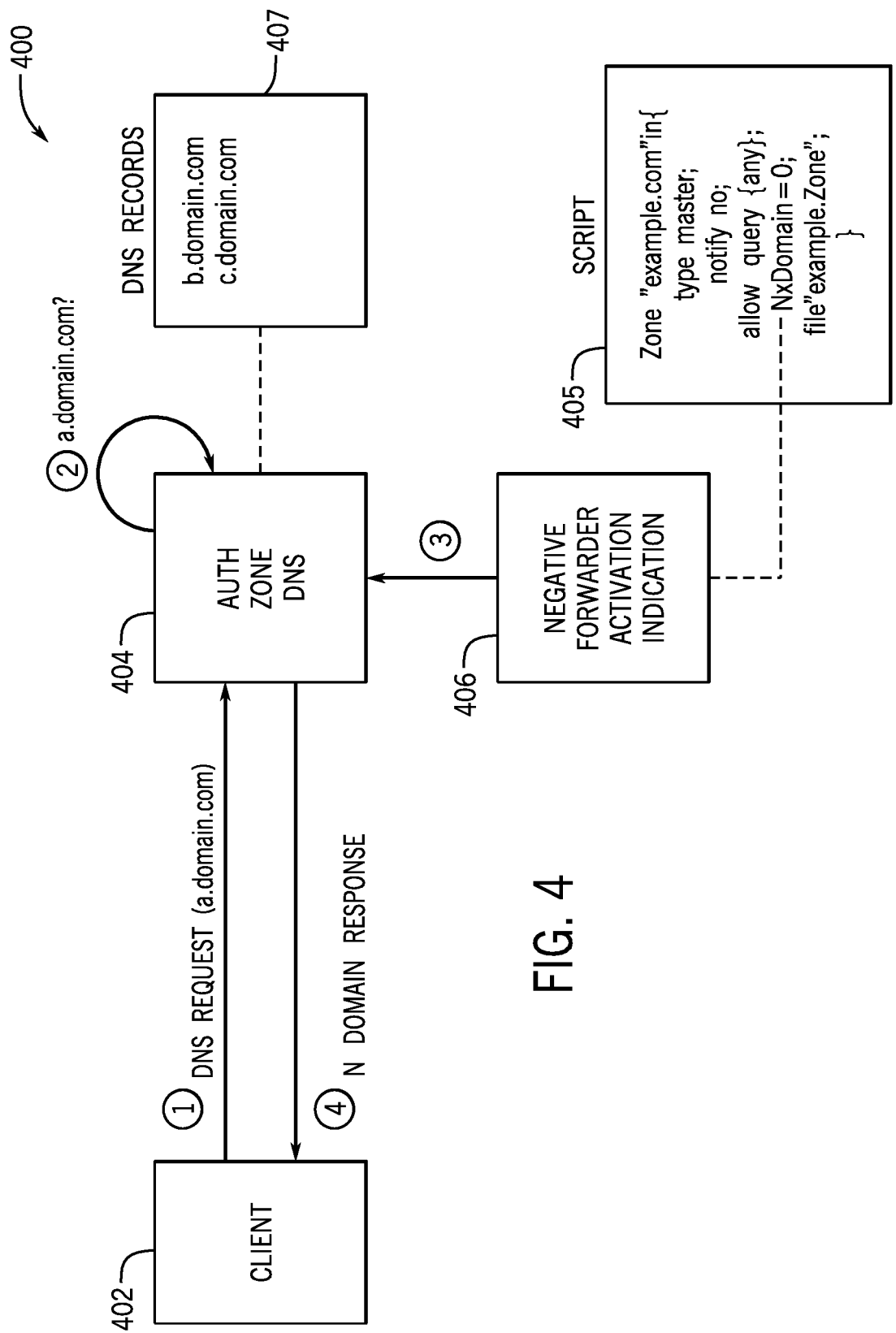
FIG. 4 is an illustration of an IP address retrieval process where a forwarder feature is disabled, in accordance with an embodiment of the current disclosure.

Now turning to an example, FIG. 4 is an illustration of a system 400 wherein a client device 402 sends a domain name request to an authoritative zone DNS service 404 that, upon receiving a negative forwarder activation indication 406, returns an alert to the client device indicating that the requested domain name could not be found, and that the forwarder service is unavailable. This illustration is meant to show a scenario in which the desired domain name is not found.

As illustrated, the system 400 includes the client device 402 sending a domain name request to the authoritative DNS service 404. The client device 402 may be a variety of devices such as a personal computer, a tablet, a smartphone, etc. used for various purposes that may require an external service, such as remote service 104 described above. These purposes may include, but are not limited to, software development, IT services, database management, customer service, etc. The domain name request is a query sent to the authoritative zone DNS service 404 for an IP address associated with the given domain name (here a.domain.com). This IP address allows the client device to interact with an external service, such as remote service 104 described above.

The client device 402 sends the domain name request to authoritative zone DNS service 404, which then searches for the domain name a.domain.com in a set of zone DNS records available to it. Here, as illustrated in the DNS records 407 of the authoritative DNS zone, the authoritative DNS may determine that it cannot resolve a.domain.com to an IP address. Thus, since the domain name is not found, the authoritative DNS zone 404 checks for a forwarder activation indication 406 indicating whether to try and resolve the domain name using a forwarder service. If the authoritative zone DNS service 404 did find the domain name and the associated IP address, the associated IP address would be returned to the client device 402.

Figure 5:
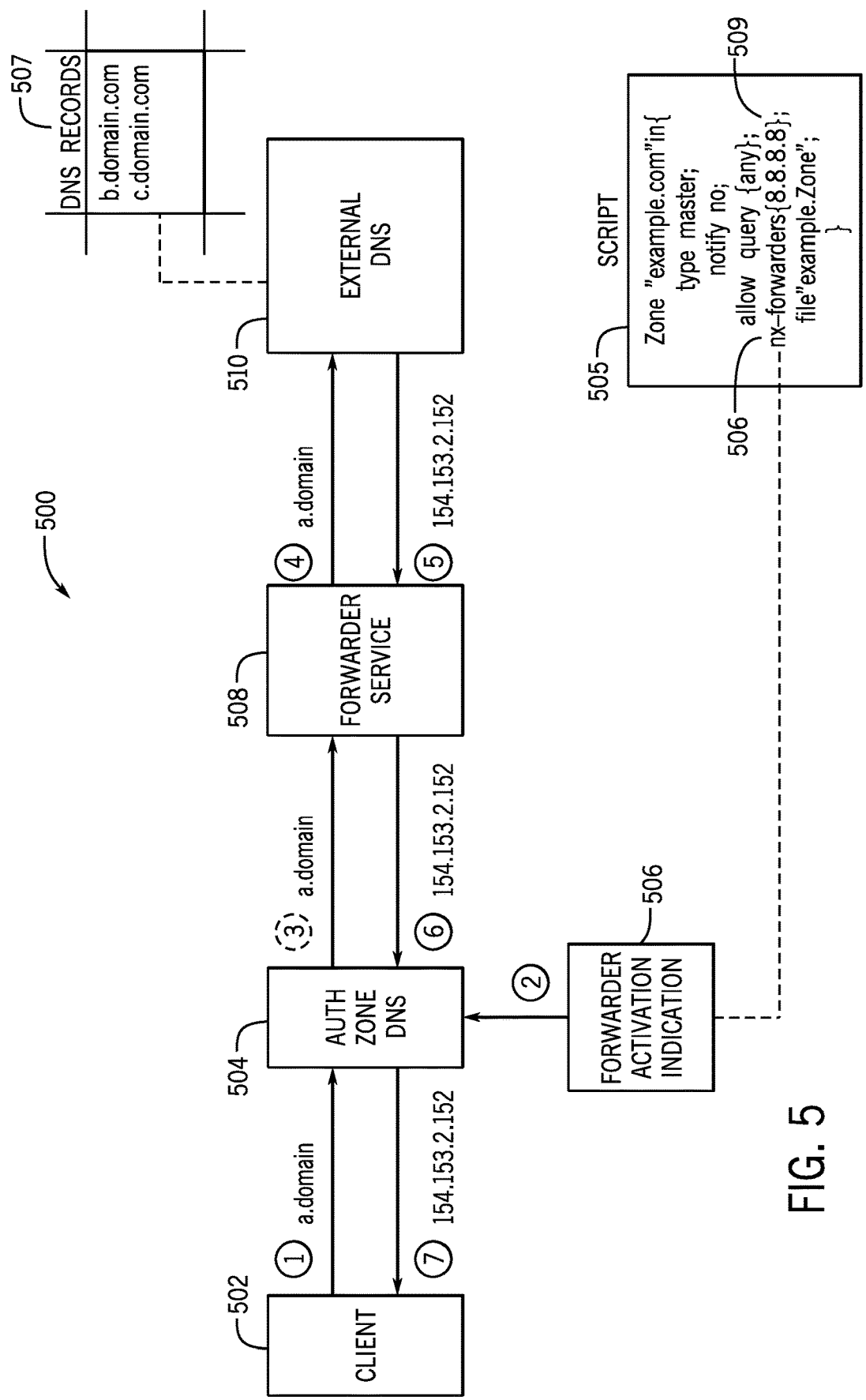
FIG. 5 is an illustration of an IP address retrieval process when a forwarder feature is enabled, in accordance with an embodiment of the current disclosure.

In this embodiment, the forwarder activation indication is negative. Specifically, the negative indication is identified based upon the lack of a forwarder service indication in the configuration file 405. Since the authoritative zone DNS service 404 did not find the requested domain name in the set of zone DNS records and the the forwarder activation indication 406 indicates not to use a forwarder service, the authoritative DNS zone 404 cannot resolve the domain name to an IP address and, thus, sends an alert to the client device 402 that the domain name resolution was unsuccessful (e.g., via an NXDomain response) and/or that the forwarder service is not active. Turning now to a different example, FIG. 5 is an illustration of a system 500 wherein a client device 502 sends a domain name request to an authoritative zone DNS service 504 that, upon receiving a forwarder activation indication 506, passes the domain name request to a forwarder service 508, which in turn forwards the domain name request to an external DNS service 510 that locates the requested domain name and returns an associated IP address to the client device 502. This illustration is meant to show a scenario in which the desired domain name is found and the associated IP address is returned to the client device 502.

The system 500 starts with client device 502 sending a domain name request to the authoritative DNS service 504. The client device 502 may be a device such as a personal computer, a tablet, a smartphone, etc. used in a variety of ways that may require an external service. Some examples of the uses this external service may have are software development, IT services, database management, customer service, etc. The domain name request is a query sent to the authoritative zone DNS service 504 for an IP address associated with the given domain name. This IP address allows the client device to interact with an external service.

The domain name request is sent to authoritative zone DNS service 504, which then searches for the domain name in a set of zone DNS records available to it. As illustrated by the DNS records 507, no record exists for the domain a.domain.com. Accordingly, the authoritative DNS zone 504 checks for the forwarder activation indication 506 that indicates whether to use a forwarder service 508 to try and resolve a.domain.com. Had the authoritative zone DNS service 504 found the domain name and associated IP address, the associated IP address would have been returned to the client device 502 without needing to identify whether a forwarder service 508 could be used for domain name resolution.

In this embodiment, the forwarder activation indication is present. Specifically, the configuration file 505 includes the presence of an indicator 507 ("nx-forwarder {8.8.8.8};") specifying to use a forwarder service upon not finding a record at the authoritative DNS zone 504. The indicator 506 specifies an address 509 (8.8.8.8) of the forwarder service 508, which indicates an address to send the domain name resolution request to. For easy parsing, the address may be surrounded by special characters (e.g., { }), indicating a location where the forwarder service address is stored.

Next, the authoritative zone DNS service 504 sends the domain name request to forwarder service 508 at the specified address. This forwarder service 508 may be hosted on a server controlled by the client, but may also be hosted on a server external to the client. In the current embodiment, the forwarder service 508 identifies an external DNS service 510 capable of locating a DNS record for the requested domain name. Having identified the external DNS service 510, the forwarder service 508 forwards the domain name request to the external DNS service 510.

Once the forwarder service 508 forwards the domain name request to the external DNS service 510, the service locates the requested domain name and the associated IP address and returns them to the client device 502. The external DNS 510 is a service external to the client, having access to zone DNS records not available to authoritative zone DNS service 504. Once it locates the requested domain name and associated IP address, it returns them to the client device 502 by a path. This path may be straight to the client device 502 or by way of the forwarding service 508 and the authoritative zone DNS service 504.

The invention claimed is:

1. A tangible, non-transitory, computer-readable medium, comprising computer-readable instructions that, when executed by one or more processors, cause the one or more processors to: receive, from a client device, at an authoritative domain name system (DNS) zone, a request to resolve a domain name to an Internet Protocol (IP) address; identify that the request cannot be satisfied via the authoritative DNS zone; and based upon identifying that the request cannot be satisfied via the authoritative DNS zone: determine whether a forwarder service is enabled, by identifying whether a forwarder indication is present in an authoritative DNS zone configuration file specific to the authoritative DNS zone; in response to determining that the forwarder service is enabled for the authoritative DNS zone: parse from the forwarder indication a forwarder service IP address of the forwarder service; and forward the request to the forwarder service IP address of the forwarder service; and in response to determining that the forwarder service is not enabled, refrain from forwarding the request to the forwarder service.

2. The tangible, non-transitory, computer-readable medium of claim 1, comprising computer-readable instructions that, when executed by the one or more processors, cause the one or more processors to: identify that a second request can be satisfied via the authoritative DNS zone; and in response to identifying that the second request can be satisfied via the authoritative DNS zone, resolve a second domain name of the second request to a second IP address and provide an indication of the second IP address to the client device.

3. The tangible, non-transitory, computer-readable medium of claim 1, comprising computer-readable instructions that, when executed by the one or more processors, cause the one or more processors to: determine that the forwarder service is enabled; and in response to identifying that the forwarder service is enabled, forward the request to the forwarder service.

4. The tangible, non-transitory, computer-readable medium of claim 3, comprising computer-readable instructions that, when executed by the one or more processors, cause the one or more processors to: identify that the request cannot be satisfied via the authoritative DNS zone, by identifying that no DNS record associating the domain name to any IP address exists in DNS records of the authoritative DNS zone.

5. The computer-readable medium of claim 1, wherein a first particular payload of the forwarder indication in a configuration file of the authoritative DNS zone indicates that the forwarder service is enabled for use and a second particular payload of the forwarder indication indicates that the forwarder service is not enabled for use.

6. The tangible, non-transitory, computer-readable medium of claim 5, wherein the forwarder indication consists of an IP address of the forwarder service.

7. The tangible, non-transitory, computer-readable medium of claim 1, comprising computer-readable instructions that, when executed by the one or more processors, cause the one or more processors to: provide an NX-Domain response when neither the authoritative DNS zone nor the forwarder service can resolve the domain name to the IP address or the authoritative DNS zone cannot resolve the domain name to the IP address and the forwarder service is not enabled for use.

8. The tangible, non-transitory, computer-readable medium of claim 1, wherein the forwarder service is internal to a local network of the client device and the authoritative DNS zone.

9. The tangible, non-transitory, computer-readable medium of claim 1, wherein the forwarder service is external to a local network of the client device and the authoritative DNS zone.

10. A method, comprising: receiving, from a client device, at an authoritative domain name system (DNS) zone, a request to resolve a domain name to an Internet Protocol (IP) address; identifying that the request cannot be satisfied via the authoritative DNS zone; and based upon identifying that the request cannot be satisfied via the authoritative DNS zone: determining whether a forwarder service is enabled, by identifying whether a forwarder indication is present in an authoritative DNS zone configuration file specific to the authoritative DNS zone; and in response to determining that the forwarder service is enabled for the authoritative DNS zone: parsing from the forwarder indication a forwarder service IP address of the forwarder service; and forwarding the request to the forwarder service IP address of the forwarder service, wherein the forwarder service is external to a local network of the client device and the authoritative DNS zone; and in response to determining that the forwarder service is not enabled, refraining from forwarding the request to the forwarder service.

11. The method of claim 10, comprising: Determining that the forwarder service is enabled, and in response to identifying that the forwarder service is enabled, forwarding the request to the forwarder service.

12. The method of claim 10, comprising: identifying that the request cannot be satisfied via the authoritative DNS zone, by identifying that no DNS record associating the domain name to any IP address exists in DNS records of the authoritative DNS zone.

13. The method of claim 10, comprising: receiving, from the client device, at the authoritative DNS zone, a second request to resolve a second domain name to a second IP address; identifying that the second request can be satisfied via the authoritative DNS zone; and in response to identifying that the second request can be satisfied via the authoritative DNS zone, resolving the domain name to the second IP address and providing an indication of the second IP address to the client device, independent of use of the forwarder service.

14. The method of claim 10, wherein the forwarder service is internal to a local network of the client device and the authoritative DNS zone.

15. The method of claim 10, wherein the forwarder service is external to a local network of the client device and the authoritative DNS zone.

16. A domain forwarding system comprising: memory; and one or more processors, wherein the one or more processors are configured to read and execute instructions stored on the memory to: receive, from a client device, at an authoritative domain name system (DNS) zone, a request to resolve a domain name to an Internet Protocol (IP) address; identify that the request cannot be satisfied via the authoritative DNS zone; and based upon identifying that the request cannot be satisfied via the authoritative DNS zone: determine whether a forwarder service is enabled, by identifying whether a forwarder indication is present in an authoritative DNS zone configuration file specific to the authoritative DNS zone; in response to determining that the forwarder service is enabled for the authoritative DNS zone: parse from the forwarder indication a forwarder service IP address of the forwarder service; and forward the request to the forwarder service IP address of the forwarder service; and in response to determining that the forwarder service is not enabled, refrain from forwarding the request to the forwarder service.

17. The system of claim 16, wherein the one or more processors are configured to: identify that a second request can be satisfied via the authoritative DNS zone; and in response to identifying that the second request can be satisfied via the authoritative DNS zone, resolve a domain name of the second request to a corresponding IP address and provide an indication of the corresponding IP address to the client device.

18. The system of claim 16, wherein the one or more processors are configured to: determine that the forwarder service is enabled; and in response to determining that the forwarder service is enabled, forward the request to the forwarder service.

19. The system of claim 16, wherein the request to resolve the domain name is received from the client device upon a remote service access action.

20. The system of claim 19, wherein the remote service access action is web browsing.

* * * * *